United States Patent [19]

Schirtzinger

[11] 4,137,986
[45] Feb. 6, 1979

[54] CAPTURED AIR BUBBLE ARCTIC VEHICLE WITH ICE CUTTERS

[75] Inventor: Joseph F. Schirtzinger, Pasadena, Calif.

[73] Assignee: Sea-Log Corporation, Pasadena, Calif.

[21] Appl. No.: 807,487

[22] Filed: Jun. 17, 1977

[51] Int. Cl.² .......................... B60V 1/04; B60V 3/04
[52] U.S. Cl. .................................. 180/119; 180/126; 280/DIG. 7; 104/23 FS; 114/42
[58] Field of Search ............... 180/116, 117, 119, 121, 180/126, 124, 125, 123, 128; 104/1 A, 136, 1 R, 23 FS, 134; 114/41–43, 67 A; 280/DIG. 7

[56] References Cited

U.S. PATENT DOCUMENTS

| 3,272,270 | 9/1966 | Hughes | 180/119 |
|---|---|---|---|
| 3,276,529 | 10/1966 | Latimer | 180/126 |
| 3,398,713 | 8/1968 | Hall | 180/119 X |
| 3,401,766 | 9/1968 | Laufman | 180/119 |
| 3,458,007 | 7/1969 | Todd | 180/128 |
| 3,521,592 | 7/1970 | Rosner et al. | 114/42 |
| 3,632,172 | 1/1972 | Robinson et al. | 114/42 |
| 3,822,558 | 7/1974 | Blankenship | 180/116 X |
| 3,908,784 | 9/1975 | Blurton | 180/116 X |

FOREIGN PATENT DOCUMENTS 1243025  6/1967  Fed. Rep. of Germany ........... 180/119

*Primary Examiner*—Kenneth H. Betts
*Attorney, Agent, or Firm*—Christie, Parker & Hale

[57] ABSTRACT

An arctic vehicle is provided for the rapid transport of goods, machinery, and personnel over ice, snow and frozen ground surfaces.

The vehicle is supported partially while at rest and/or under way by a cushion of air which is entrained by a system of seals. Seals along the sides terminate in runners for guiding and partially supporting the vehicles. A cutter system is deployed in front of each runner to form smooth running tracks or furrows over ice, snow, and frozen ground surfaces. A transverse cutter may be deployed in front of the forward transverse seal for removing major ice protrusions between the runners, to reduce seal leakage and wear, and improve ride characteristics. The cut tracks, in addition to providing smooth transit, engage the runners and side seals to prevent lateral shifting of the vehicle by the action of crosswinds and sideslopes.

The vehicle may be self-propelled or towed. Through the use of the air cushion, frictional resistance to movement is substantially reduced, requiring correspondingly less motive power or towing force. Also the load of the vehicle is distributed over a larger area.

The vehicle may be part of a train system pulling similar cars whose running friction is reduced by a common air bubble formed between longitudinal seals of the driving vehicle and drawn cars and end seals. In the alternative, the driving vehicle and each drawn car may be provided with an air pressure seal system to provide individually contained air bubbles.

21 Claims, 8 Drawing Figures

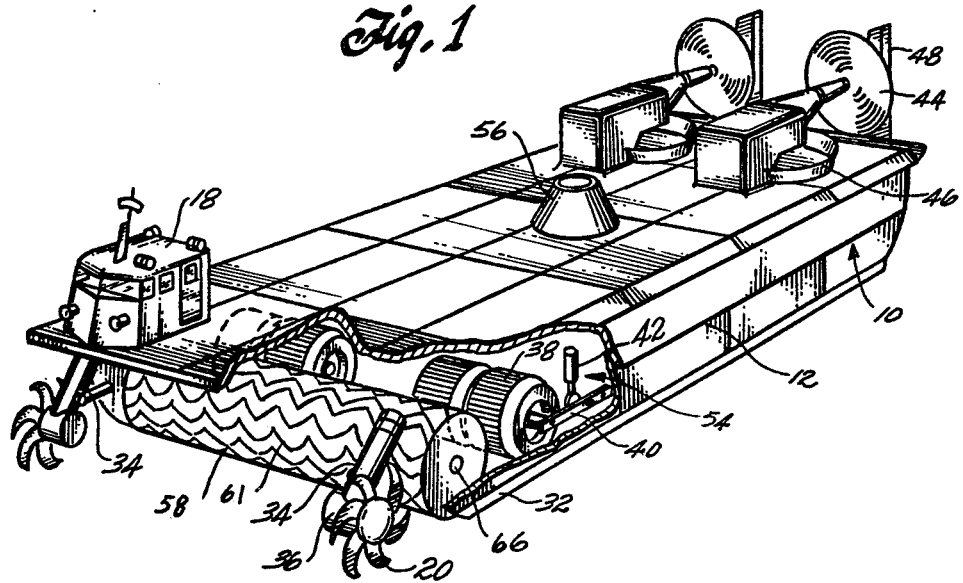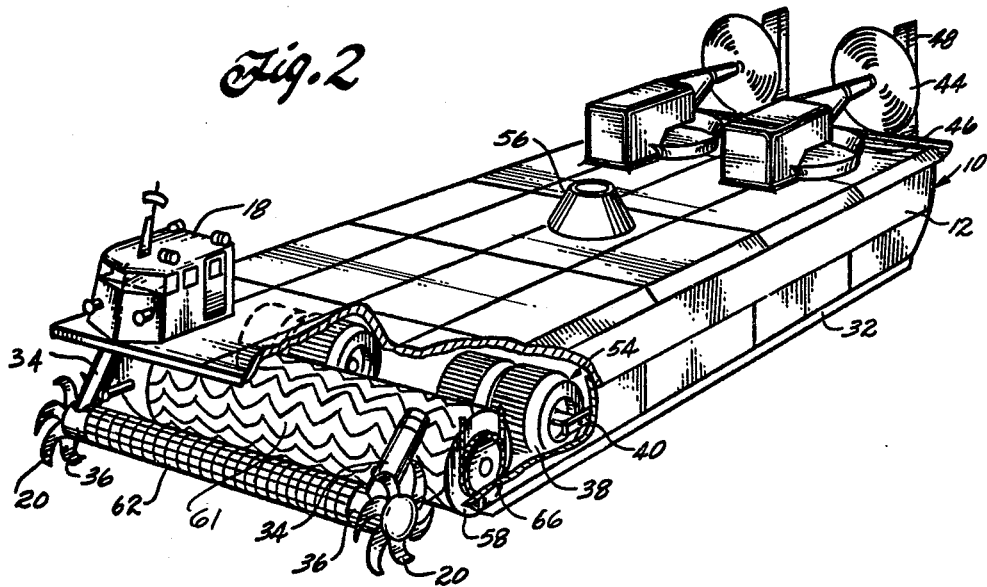

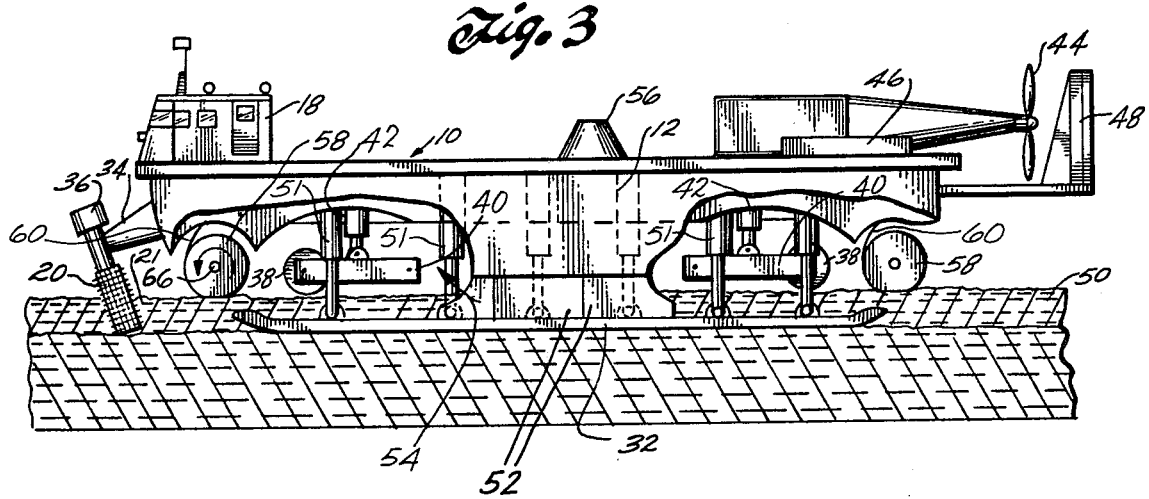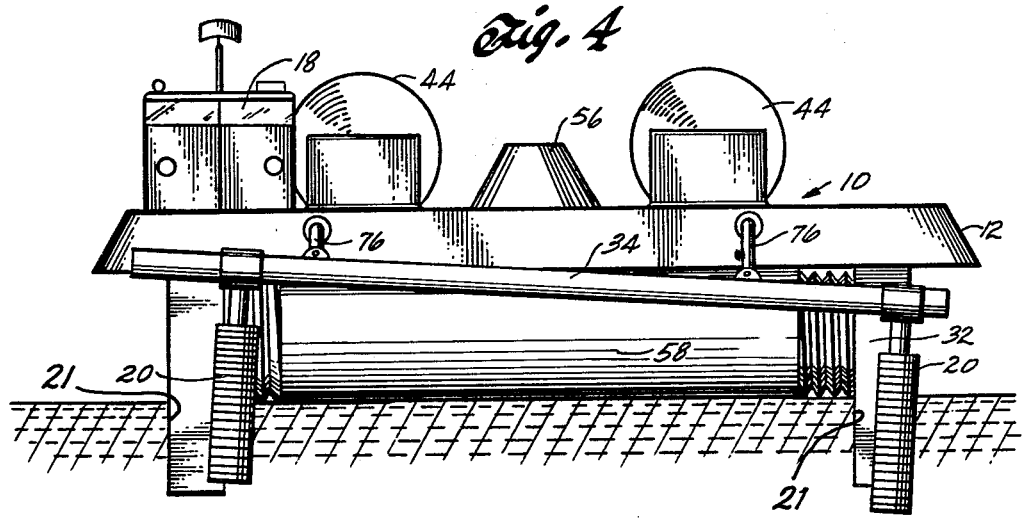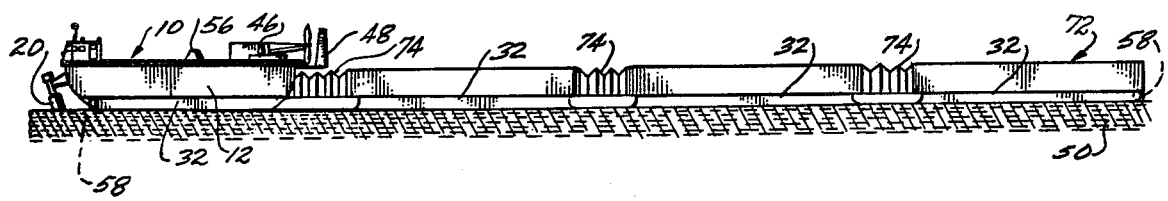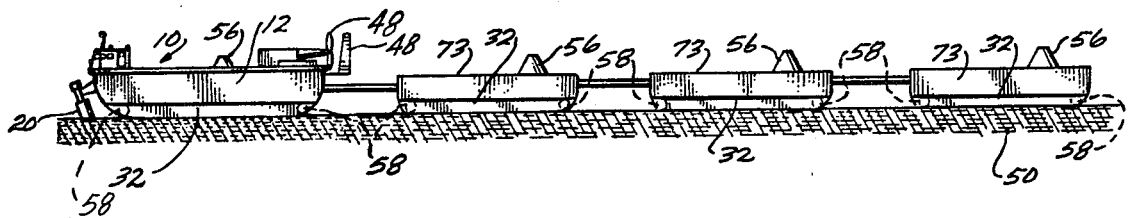

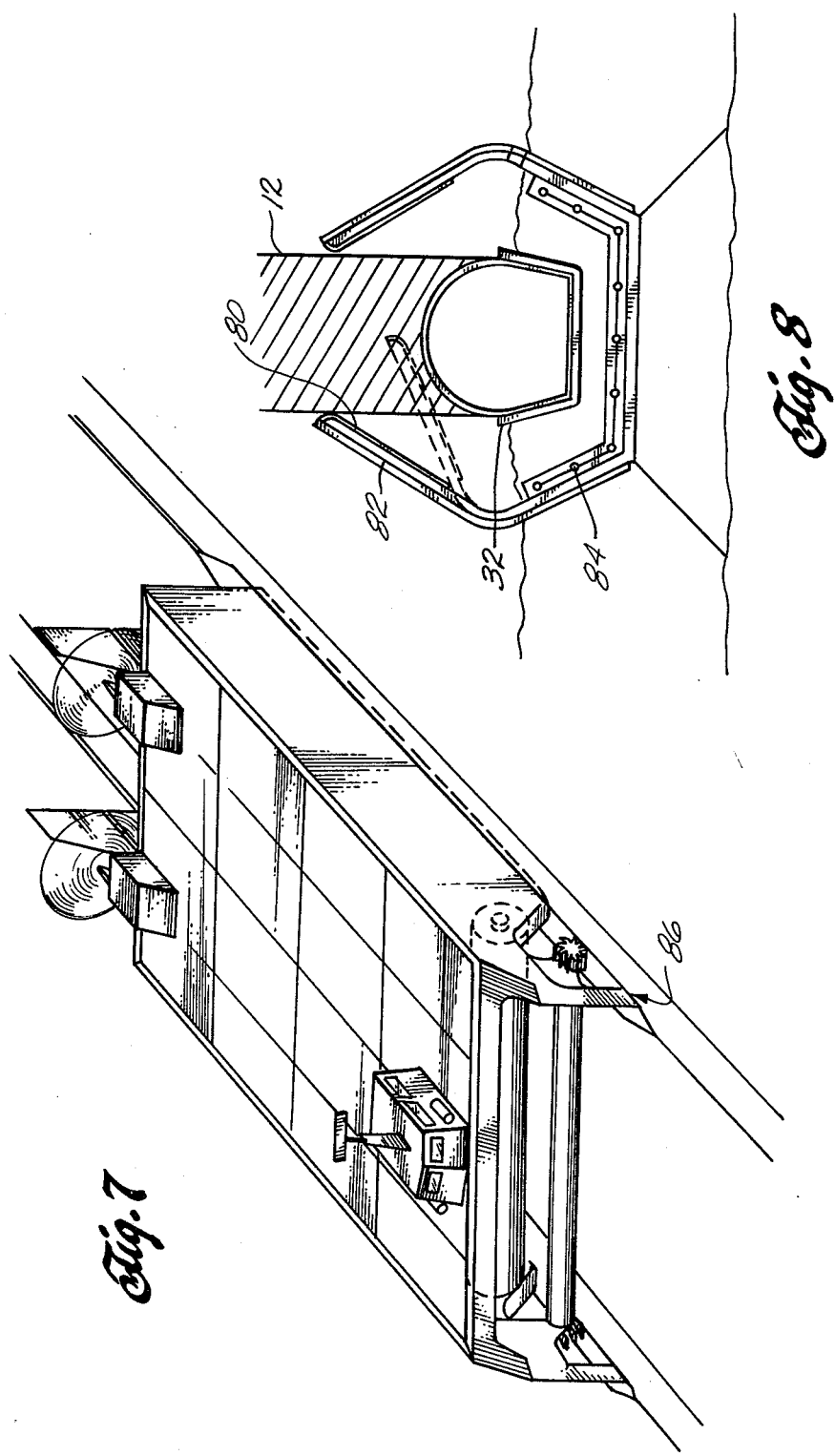

CAPTURED AIR BUBBLE ARCTIC VEHICLE WITH ICE CUTTERS

BACKGROUND OF THE INVENTION

The discovery of valuable minerals in arctic areas such as the north shore of Alaska, the islands of Canada, and Greenland have presented a problem of accessibility by sea for transportation of both personnel and equipment for development of the mineral values present in thee areas.

Normally, accessibility by sea is less than two months of the year and for the remaining period of time, accessibility is limited to both the size and weight limitations of airborne cargo carriers.

These limitations and the high cost per productive hour of labor due to climatic extremes and long logistic lines have made installation costs of exploration equipment prohibitively high and their installation economically questionable.

Ice formations also preclude the transport of cargo and the like in lakes and rivers for many months of each year.

Captured air bubble type ground effect vehicles have heretofore been proposed, such as in U.S. Pat. No. 3,458,007. They utilize rigid runners or skegs running fore and aft with spaced transverse seals to form a plenum chamber. This type of vehicle is useful only over water where the skegs project into the water to trap the air. Over land, because of irregularities in terrain, such rigid skegs cannot form an effective seal.

SUMMARY OF THE INVENTION

According to the present invention, there is provided an arctic vehicle having means to cut tracks through the ice for guiding runners and forming side seals of a plenum chamber, permitting the smooth transport of machinery, goods and personnel over ice, snow, ice hardened or frozen ground surfaces, and, through the use of prepared trackways, over soft or debris laden surfaces as well. The vehicle preferably has the ability to move over landbound or floating ice.

The vehicle consists of a hull having mounted on the undersurface thereof at least two longitudinal runners. A propulsion and stabilization system, such as wheels or Caterpillar tracks are provided between or in line with the runners. Ahead of each runner there is provided ice-cutting means which cuts a track or path sufficiently wide to receive a runner. The track provides a smooth running surface and by engaging the runner prevents excessive lateral movement of the vehicle due to the action of side slopes and crosswinds, and also provides a good air seal. Between the front and back ends of the runners there are provided transverse seals to enable the formation of a low pressure gas bubble by gas flow into a plenum chamber formed by the runners and transverse seals. This provides the vehicle with lift to reduce friction during transit. The transverse seals may be static or rotary, idle or driven, and in the latter case can be used as part of a propulsion system.

Ahead of the forward transverse seal there may be provided transverse ice chopping means to smooth the surface of the ice ahead of the transverse seals to improve the seal and reduce both drag and wear.

While functional as a transport vehicle alone, the vehicle equipped with propulsion, may be part of a train system pulling cars of a similar nature, or each self-propelled, whose running friction is reduced by a common plenum formed between the driving vehicle and drawn car and end seals. In the alternative, the forward vehicle and each following car may be provided with seal systems to establish individually contained plenums.

Where desired, the vehicle may be provided with an automatic system for altering the depth of the cut tracks to provide banked turns.

The air cushion retaining sidewalls may include a labyrinth of overlapping articulated panels, to provide sidewall flexibility over particularly rough terrain. Also, flexible air cushion retaining sidewalls may be provided for operation over particularly rough terrain, assistance in entering and exiting from open leads, etc; these could be retractable, and mounted on the side seal runners. The runners themselves could be retractable in such a way as to allow the flexible seal to perform its function.

THE DRAWINGS

FIG. 1 is a detail bow view of the arctic vehicle of this invention, showing an air bubble support system, with semirigid sidewalls seals, a rotating forward transverse seal, ice cutters in front of the side seals, and air propellers and wheels for propulsion.

FIG. 2 is similar to FIG. 1 but with an added transverse ice removal system to clear irregularities on the ice surface.

FIG. 3 shows the normal position of possible propulsion elements of the vehicle when moving over ice, with a different kind of cutter system.

FIG. 4 shows an arrangement for making banked turns using the ice chipping system to cut banked running surfaces.

FIGS. 5 & 6 show the arctic vehicle of this invention used as part of a train.

FIG. 7 shows a possible embodiment of the sidewall operating in a prepared trackway, with internal frozen running surface.

FIG. 8 is a cross section of the prepared trackway of FIG. 7.

DETAILED DESCRIPTION

With reference to FIGS. 1 and 2 the arctic vehicle 10 of this invention consists of buoyant water tight hull 12 housing fuel and provisions for the crew and which may provide cargo storage space for the transport of materials to and from ice-bound sites, over ice surfaces and the like. Engines, to provide power for the ice cutters 20, the electrical and power requirements for the control house 18, the air cushion system, and possibly propulsion, may be located on deck, or within the hull 12, with the air and exhaust inlets and outlets (not shown) provided on the deck surface and/or the port, starboard and stern sides of hull 12.

The prime source of power may be gas turbines, steam generators, internal combustion engines, nuclear engines and the like, with gas turbines being preferred for simplicity of operation.

Both crew quarters and control operations for the vehicle are normally located in control house 18.

There are also provided antennas to maintain communications with the shore, radar for navigational purposes, lights, and monitoring TV cameras. Laser guidance systems may also be included.

There is provided a pair of longitudinal runners 32 for supporting the vehicle on ice, snow, or frozen terrain. Ice cutters 20 are mounted on a framework 34 which may, as will be described, be movable for movement of the cutters, 20 relative to runners 32. An ice cutter is positioned in front of each runner to form a track for the runners in the ice. By "ice cutter" there is meant any rotary, reciprocating or like device capable of chipping and/or cutting ice, with a chipping action preferred as this requires less energy. One such system is that described in U.S. Pat. No. 3,521,592 issued to Rosner et al. As shown in FIGS. 1 and 2, ice cutters 20 may be of a "saw blade" type rotating about a horizontal axis and consisting of one or more blades capable of cutting a path over the ice surface at least coextensive with the width of the longitudinal runners 32. Alternatively, as shown in FIG. 3 the cutters 20 may be cylindrical in shape and rotatable about a substantially vertical axis. When vertically disposed and comprising a plurality of rotating ice chipping discs, the ice cutters 20 are preferably mounted at some angle to the vertical so that the ice cut or chipped will be thrown out of the cut paths, as shown in FIG. 3. Since expelled ice may strike the bow of the vehicle and support members they are preferably covered with an elastomeric or a reflective surface to prevent damage to the bow and support structures. As shown, each individual cutter is driven by its own motor 36, with power being provided by the vessel. In the alternative, the power for each cutter 20 may be contained within hull 12 and the cutters 20 driven through a suitable transmission drive.

With reference to FIGS. 1 to 3, an essential function of ice cutters 20 is to cut paths or tracks 21 through the ice or irregular hard-frozen ground to provide a smooth running and sealing surface. The cutting action can also provide thrust, for vehicle propulsion. The depth to which ice is cut, is controlled by adjusting the vertical position of the cutter by a suitable sensor system (not shown) such as a forward looking laser system, to accommodate changes in terrain elevation, hummocks, etc. Traction wheels 38 may be used, as shown, or be positioned to run in a smoothly cut trackway. The wheels 38 are pivotally mounted on drive system 40 and held in a retracted or extended position by hydraulic cylinder 42. When extended, the wheels 38 run along the surface of the ice or ground. When the wheels 38 are retracted, longitudinal runners 32 serve to support the vehicle on either ice or land together with an air cushion formed under the vehicle as hereinafter described.

As as alternative to the use of wheels, there may be employed Caterpillar tracks or the like (not shown). During movement on ice or land, the wheels or Caterpillar tracks carry at least part of the load of the vehicle and serve to propel it in either a foward or reverse direction and, where required, may be provided with studs to increase traction on the ice 50.

With reference to FIGS. 1 to 3, yet another or alternate means of propulsion are raised motor driven propellers 44 which serve alone or in conjunction with an ice engaging propulsion system to drive the vehicle over ice and/or land. The propellers may be pivoted for turns using turntable 46 and/or fins 48. Jet engines and the like may also be used. The use of motor driven propellers or jet engines is preferred as they provide a convenient propulsive means for moving the vehicle either over ice or land surfaces.

The runners are preferably made of material that flexes slightly with any irregularities in the tracks. Alternately the runners may be made in articulated sections. The runners 32 are secured to and support the hull 12 through a plurality of hydraulic or pneumatic spring units 51. A series of side plates attached to the runners at the points wherein spring units 51 attach to the runners, extend upwardly in overlapping relation to the sides of the hull 12. The side plates are arranged to maintain a sealed side wall between the flexible runners and the hull.

With reference to FIGS. 1-3, there is provided as part of the arctic vehicle system a plenum chamber 54 beneath the vehicle and pressurized by fans or blowers in ducts 56 which force air into the chamber beneath the vehicle to provide lift to reduce surface friction. Plenum chamber 54 is formed of the longitudinal runners 32 and sidewalls of the vehicle and front and rear seals 58 preferably operating in conjunction with wiper seals 60. The sidewalls are composed of overlapping plates, the lower set of plates 52 being secured to the runners. The runners are able to flex vertically by virtue of the supporting spring units 51 spaced along the length of the runners. The overlapping plates permit the runners to flex vertically while maintaining air seals between the runners and the vehicle. As illustrated, cylindrical end seals 58 are capable of rolling over the surface of ice or frozen ground. They may be idle, that is, non-driven or driven using a convenient propulsive means, such as chain drive. Where driven, and as illustrated in FIGS. 1 and 2, the end seals 58 may be provided with treads 61 which serve to grip the surface of the ice to act as part of the propulsion system. When traveling over the surface of ice as shown in FIG. 3, the end seals 58 roll on or are driven over the surface of the ice alone or by force provided by the driving wheels 38 alone or in conjunction with another propulsive means, such as the motor driven propellers 44.

The longitudinal runners 32 engage the tracks 21 cut by ice cutters 20 while the end seals 58 engage the surface of the ice transversely between runners 32. Wiping seals 60 complete the seal to form plenum chamber 54 and serve also to wipe the surface of the seals 58. Wiping seals 60 may be a biased flap, a brush surface or air curtain, or the like depending on the nature of the rolling end seals 58 employed.

Air is forced alone or in combination with the exhaust gases by ducts 56 into plenum chamber 54 formed by longitudinal runners 32, sidewalls 12, and end seals 58. This low pressure plenum air, e.g. about 1 psi, provides a degree of lift to the vehicle so that the friction between runners 32 and the track 21 cut in the surface of the ice is minimized.

As shown in FIG. 3, the wheels 38 may ride over the surface of the ice between the tracks occupied by runners 32 or the ice cutting means may cut a path sufficiently wide for wheels 38 to enter and engage the ice within the cut tracks. In this connection driving means are immediately adjacent the longitudinal runners 32.

Rolling end seals 58 may conveniently have flexible surfaces as provided by an inflated cylindrical bag rotatably mounted on shaft 66 for rotation and which because of surface flexibility will conform to contours and irregularities on the surface of the ice as well as frozen ground.

For many ice bound conditions, the rolling seals 58 being flexible will conform to normal irregularities on the surface of the ice to perfect a seal therebetween to minimize loss of air from plenum chamber 54. Where the ice surface or frozen ground is quite irregular as under conditions where ice floes are encountered or where there is a continuous freezing and thawing of the surface of the ice, the ice surface may become so irregular that independent of the flexibility of the rolling end seals, excessive air leakage would be encountered. In this connection as shown in FIG. 2 there may be employed between ice cutters 20 a horizontal transverse cylindrical ice cutter 62 which rotates in conjunction with ice cutters 20 to remove surface irregularities from the ice to create a smooth surface for contact with the rolling seals 58. The cutting action can also provide thrust, for vehicle propulsion.

Since the amount of ice removed, however, is minimum relative to the condition where all the ice ahead of the vehicle needs to be cut to the depth occupied by ice cutters 20, the energy requirements to form a relative smooth path between adjacent runners 32 is minimized.

As an alternate to the use of rotatable front and rear seals, whether idle or driven, there may be employed transverse skirts or flaps biased to ride along the surface of the ice or frozen ground. The skirt of this nature is generally flexible at least at its ends to conform to minor surface irregularities and may be employed with the transverse cutters 62 which remove major irregularities on the surface of the ice. Fairly rigid transverse skirts can be used, in conjunction with the smooth surfaces provided by the transverse ice cutters 62, which leave only relatively small air gaps through which air leakage, if any, is minimum.

By providing transverse cutters 62 in a preferred construction of the arctic vehicle of this invention, the arctic vehicle can encounter ridges of varying height and even those which might cause the vehicle to lose an undue amount of pressurized captured air. Increases, in friction, and wear on the fore and aft seals are minimized. In some terrain, without the transverse cutter, unacceptably large air losses from the air support plenum would occur, at a higher rate than could be made up by the pressurizing support fans, in ducts 56.

The transverse seals 58 of the rotating type, are relatively large diameter tubes, constructed of elastomeric material and inflated to relatively low pressure. When rotated on transverse axles 66 the tubes are compressible to some degree for intimate sealing transverse across the vehicle to provide a captured air bubble. Low pressure inflation is, therefore, preferred. The rollers, for instance, may flatten to perhaps about 25% of their radius to maximize the seal. While the rolling seals 58 have been illustrated as a single roller they may be composed of a multitude of contacting roller seals in parallel.

As indicated, the seals provided between the upper surface of the roller and the arctic vehicle undersurface structure sustains the plenum chamber. This seal may, of course, be provided by maintaining a small clearance transversely across the upper surface of the roller with, as indicated, a secondary seal 60 bearing against the roller surface to perfect the seal and scrape off debris accumulated by the roller surface. As an alternative, a brush arranged transversely along the top of the roller can be used to provide cleaning and a secondary sealing effect.

Since the arctic vehicle of this invention, while intended for primarily arctic environments may encounter temperatures both below and above freezing, to insure complete operation of the sealing surface, particularly at locations where clearances are small and to prevent freezing and seizing of the rolling seals, there may be provided means (not shown) to heat the seals. This may be accomplished by inducing a portion of the flow of the exhaust heat from the vehicle power plant at selected areas to induce localized heating of the exterior and interior of the surface of the roller so to prevent freezing or induce thawing.

With reference to FIGS. 5 and 6, the vehicle of this invention is as indicated to move alone or as part of a train for movement over expansive areas of ice frozen surfaces and water. Low friction movement which reduces power requirements substantially are achieved by the captured air bubble.

FIG. 5 illustrates one means by which the arctic vehicle of this invention may be employed as a train. In this situation, the forward and rearward cars 10 and 72 of the train are provided with the transverse seals 58 and the runners 32 of each unit of the train provide the lateral sealing. Between each car of the train there is provided a seal curtain 74 possibly in the form of a flexible bellow. The bellows permit movement of cars relative to one another without loss of the captured air bubble, but enable the cars to move around a relatively sharp radius turn.

As illustrated in FIG. 6, each car 73 of the train may be provided with individual plenum chambers formed by the forward and rear transverse seals 58 in combination with the longitudinal runners 32. Each unit 73 will be provided with a power source (not shown) to force air from duct 56 into the plenum chamber provided to produce lift to reduce friction during transit.

With reference now to FIG. 4, the forward ice cutters 20 may be arranged to be moved laterally, so as to cut grooves in the ice that are on a radius of curvature, which the vehicle will follow to effect a turn. Also, the cutters 20 may be arranged to rotate about a transverse plane to vary the depth of cut ahead of the vehicle, so as to permit operation at high speed on ice, particularly in turns. As shown, means such as hydraulic adjustors 76 are provided to raise one cutter and lower the other in the direction of turn. In this way, a bank is cut so as to minimize lateral forces during turns and to maximize the forces normal to the surface of the cut groove or track. The amount that one cutter is raised or lowered relative to the transverse plane will, of course, vary depending upon the radius of curvature of the turn to be made, and the speed in the turn. It will be appreciated that as the heights of the cutters are varied relative to the undersurface of the runners, the runners will rise up and move along the surface of the formed bank.

In addition to the air bubble lift employed to minimize friction, the surface of the runners 32 themselves may also be employed to minimize friction and insure smooth transit. The runners 32 may be constructed of a low friction surface such as teflon or an olefin polymer, particularly in instances for transport over ice.

A most unique feature of this invention is the versatility of the arctic vehicle of this invention to compensate for strong sidewinds which would normally deviate a vehicle from its track. Because the runners 32 ride in a path 21 cut by the cutters 20, the sidewalls of the runners are maintained in close approximate contact with the cut grooves or tracks 21 and the amount of lateral movement is kept to a minimum.

In normal forward motion runners 32 are straight while exhibiting a degree of resilience to lateral forces. As some clearance exists between the base of the runners 32 and the running channels 21 there is permitted a small amount of yaw to permit a change of heading adequate for normal navigational purposes.

In FIGS. 7 and 8 is shown an alternative trackway system. This would be built in areas where ground thawing occurs, or for a variety of other reasons such as the presence of boulders, fallen logs, and other debris in the region between the tracks; in the latter case, the tracks would be elevated. Operation of the vehicle as over a naturally frozen surface, e.g. ice, is simulated by running water in this prepared trackway, and having it frozen by ambient temperatures or refrigeration. The running surface water (ice) could also be supplied by the vehicle itself, per the foregoing discussion. Means are provided to have the ice in the trackway covered, when not in use by the vehicle, in order to minimize melting. Specifically, the track consists of an outer split tubular liner of flexible plastic material 80 with springs 82 molded in the sidewalls to normally urge the split edges together. Ice is formed in the bottom of the tubular liner. Refrigeration coils 84 may be included for this purpose. The vehicle has guides 86 in front of the ice cutters 20 for spreading the liner along the slit for opening the track to the runners. The ice cutters 20 may be replaced with brushes which act to keep the frozen track surface clean and clear. A dam arrangement may be incorporated to assist in the control of water flow and level, for ice formation, in hilly terrain.

What is claimed is:

1. A vehicle for the transport of cargo over the ice, and frozen or other ground surfaces, comprising:
    (a) a cargo carrying hull including a source of power for the vehicle and means to control operation of the vehicle;
    (b) at least one pair of spaced longitudinal runners beneath the undersurface of the hull and running lengthwise of the cargo carrying hull;
    (c) first ice cutting means positioned forward of each runner adapted to cut a track in the surface of ice and frozen ground of a width and depth at least sufficient to engage the runner to provide a running surface and prevent lateral movement of the vehicle by the action of crosswinds;
    (d) fore and aft transverse seal means positioned between said runners, said seal means adapted to form sealing contact between the undersurface of the hull and the ice and frozen ground surfaces to form in combination with the runners a plenum chamber;
    (e) means to induce the flow of a gaseous medium into the plenum chamber to pressurize the plenum chamber and provide lift to the vehicle to minimize friction between the runners and the cut track and minimize friction during transit of the vehicle over the surface.

2. A vehicle as claimed in claim 1 further including means to propel the vehicle over the surface of ice and frozen ground.

3. A vehicle as claimed in claim 2 which includes horizontally oriented, transverse second ice cutting means positioned ahead of the forward seal means and at least coextensive with the width thereof, said second ice cutting means adapted to remove irregularities from ice and frozen ground surfaces between the tracks cut by the first ice cutting means to improve the seal formed by said seal means.

4. A vehicle as claimed in claim 3 in which the first ice cutting means are rotatable about a common transverse plane of the vehicle to vary the depth of the tracks cut ahead of the runners to form banked tracks to minimize lateral forces during turning of the vehicle, and in which the ice cutters are movable laterally so as to cut a groove in the ice which is curved, for the vehicle to effect a turn.

5. A vehicle as claimed in claim 3 in which at least the forward seal means comprise cylinders rotatably mounted to the vehicle along the cylindrical axis thereof and include a flexible surface for conforming to contours and irregularities of ice and frozen ground surfaces.

6. A vehicle as claimed in claim 5 in which the cylinders are rotatably driven.

7. A vehicle as claimed in claim 6 in which the surface of the cylinders include traction means to grip the surfaces of the ice and frozen ground.

8. A vehicle as claimed in claim 2 in which the first ice cutting means are rotatable about a common transverse plane of the vehicle to vary the depth of the tracks cut ahead of the runners to form banked tracks to minimize lateral forces during turning of the vehicle, and in which the ice cutters are movable laterally so as to cut a groove in the ice which is curved, for the vehicle to effect a turn.

9. A vehicle as claimed in claim 2 in which at least the forward seal means comprise cylinders rotatably mounted to the vehicle along the cylindrical axes thereof and include a flexible surface for conforming to contours and irregularities of ice and frozen ground surfaces.

10. A vehicle as claimed in claim 9 in which the cylinders are rotatably driven.

11. A vehicle as claimed in claim 10 in which the surface of the cylinders include traction means to grip the surfaces of the ice and frozen ground.

12. A vehicle as claimed in claim 1 in which the tracks formed by the first ice cutting means exceed the width of the runners and extend inwardly thereof and the propulsion means include a retractable powered traction drive system providing traction surfaces which engage the inner portions of the tracks cut by the first ice cutting means.

13. A train system for transporting cargo over ice, and frozen ground surfaces which comprises:
    (a) a pulling vehicle comprising:
        (i) a hull including a prime source of power for at least the pulling vehicle means of propulsion and means to control operation of the train;
        (ii) at least one pair of spaced longitudinal runners positioned beneath the undersurface of the hull and running lengthwise thereof;
        (iii) first ice cutting means positioned forward of each runner adapted to cut a track in the surface of ice and frozen ground of a width and depth at least sufficient to engage the runner to provide a running surface and prevent lateral movement of the vehicle by the action of crosswinds;
        (iv) fore and aft transverse seal means positioned between said runners, said seal means adapted to form sealing contact between the undersurface of the hull and ice and frozen ground surfaces to form in combination with the runner and plenum chamber;
        (v) means to induce the flow of a gaseous medium into the plenum chamber to pressurize the plenum chamber and provide lift to the vehicle to minimize friction between the runners and the cut track and minimize friction during transit of the vehicle over the surface of water, and
        (vi) means to propel the vehicle over the surface of water, ice and frozen ground;

(b) a plurality of drawn vehicles coupled in series to the pulling vehicle, each drawn vehicle comprising:
   (i) a cargo carrying hull;
   (ii) at least one pair of spaced longitudinal runners positioned beneath the undersurface of the hull and running lengthwise of the cargo carrying hull and substantially aligned in longitudinal relation with the runners of the pulling vehicle;
   (iii) fore and aft transverse seal means positioned between said runners, said seal means adapted to form sealing contact between the undersurface of the hull and ice and frozen ground surfaces to form in combination with the runners a plenum chamber;
   (iv) means to induce a flow of a gaseous medium into the plenum chamber to pressurize the plenum chamber and provide lift to the vehicle to minimize friction between the runner and the tracks cut by the pulling vehicle.

14. A train system as claimed in claim 13 which includes horizontally oriented, transverse second ice cutting means positioned ahead of the forward seal means and at least coextensive with thereof, said second ice cutting means adapted to remove irregularities from ice and frozen ground surfaces between tracks cut by the first ice cutting means to improve the seal formed by said seal means.

15. A train system for the transport of cargo over ice and frozen ground surfaces which comprises:
   (a) a pulling vehicle comprising:
      (i) a hull including the prime source of power for the train means of propulsion and means to control operation of the train;
      (ii) at least one pair of spaced longitudinal runners positioned beneath the undersurface of the hull and running lengthwise thereof;
      (iii) first ice cutting means positioned forward of each runner and adapted to cut a track in the surface of ice and frozen ground of a width and depth sufficient to engage the runner to provide a running surface and prevent lateral movement of the vehicle by the action of crosswinds;
      (iv) first transverse seal means positioned between said runners behind the first ice cutting means, said seal means adapted to form sealing contact between undersurface of the hull and water, ice and frozen ground surfaces to form in combination with runners a portion of a continuous train plenum;
   (b) a plurality of drawn vehicles coupled in series to the pulling vehicle, each vehicle comprising:
      (i) a cargo carrying hull;
      (ii) at least one pair of spaced longitudinal runners positioned beneath the undersurface of the hull and running lengthwise thereof and running lengthwise of the cargo carrying hull and substantially aligned in longitudinal relation with the runner of the pulling vehicle;
   (c) a second transverse seal means between the longitudinal runners of the rearmost drawn vehicle and positioned rearward of the drawn vehicle, said second transverse seal means adapted to form sealing contact between the undersurface of the hull and water, ice and frozen ground surfaces to form in combination with runners the pulling drawn and pulled vehicles of the plenum chamber;
   (d) flexible track engaging sealing means between the pulling vehicle and each drawn vehicle said flexible track vehicle engaging sealing means, the runners and the first and second transverse seal means forming a plenum chamber;
   (e) means to induce the flow of a gaseous medium into the plenum chamber to pressurize the plenum chamber to provide lift to reduce friction between the runners of each vehicle forming the plenum and the running surface.

16. A train system as claimed in claim 15 which includes horizontally oriented, transverse second ice cutting means positioned ahead of the forward seal means and at least coextensive with thereof, said second ice cutting means adapted to remove irregularities from ice and frozen ground surfaces between tracks cut by the first ice cutting means to improve the seal formed by said seal means.

17. A vehicle for operation over ice or other supporting surface, comprising a hull, a pair of parallel runners extending downwardly from the hull for movably supporting the hull on the ice surface, each runner having an inner wall extending upwardly from the bottom edge of the runner to the hull, front and rear sealing members extending transversely of the vehicle below the hull and between the inner walls of the runners to form with the walls and the surface of the ice a plenum chamber between the sealing members, means supported from the hull in front of the runners to form grooves in the supporting surface for receiving the respective runners, and means for pumping air into the chamber with sufficient pressure to reduce the weight of the vehicle transferred to the ice through the runners but not sufficient to lift the runners off the ice.

18. Apparatus of claim 17 wherein the sealing members each includes a substantially cylindrical roller having the axis of revolution extending transverse to the runners, and means rotatably supporting the rollers, the ends of the rollers being closely spaced from the inner walls of te runners and the bottom of the hull to limit leakage of air from the plenum chamber.

19. Apparatus of claim 18 wherein the rollers comprise compressible material that deforms on contact with irregularities in the surface.

20. Apparatus of claim 18 wherein the bottom of the runners extends below the bottom of the rollers.

21. Apparatus of claim 18 including means for driving the rollers to propel the vehicle.

* * * * *